May 27, 1969  R. R. SCHULTE  3,445,916
METHOD FOR MAKING AN ANATOMICAL CHECK VALVE
Filed April 19, 1967
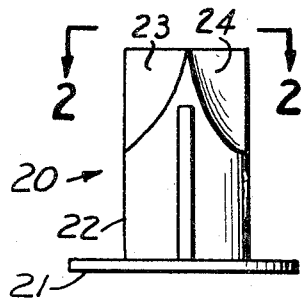
FIG. 1
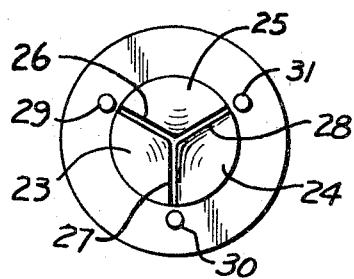
FIG. 2
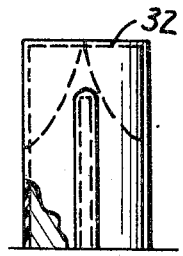
FIG. 3
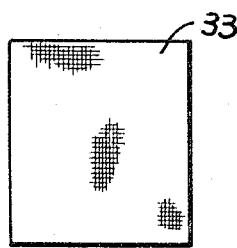
FIG. 4
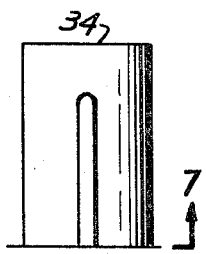
FIG. 5
FIG. 6
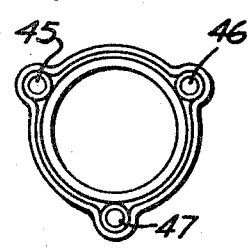
FIG. 7
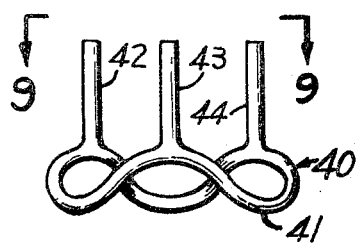
FIG. 8
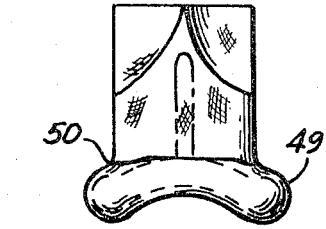
FIG. 10   FIG. 11
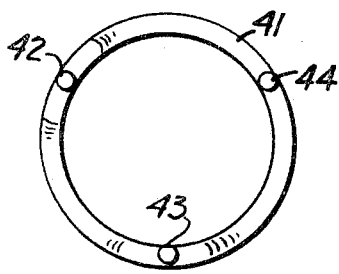
FIG. 9
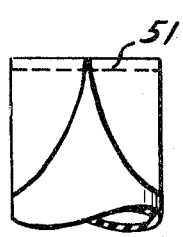
FIG. 12
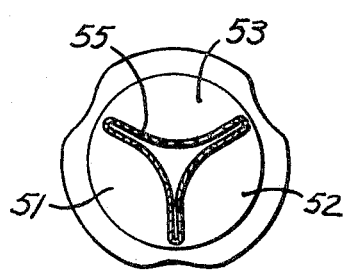
FIG. 13
INVENTOR.
RUDOLF R. SCHULTE
BY
*Angus & Mon*
ATTORNEYS.

United States Patent Office 3,445,916
Patented May 27, 1969

3,445,916
METHOD FOR MAKING AN ANATOMICAL CHECK VALVE
Rudolf R. Schulte, 3328 Calle Fresno,
Santa Barbara, Calif. 93105
Filed Apr. 19, 1967, Ser. No. 632,019
Int. Cl. B23p 17/00; A61f 1/22; F16k 15/14
U.S. Cl. 29—458                                                2 Claims

ABSTRACT OF THE DISCLOSURE

This invention relates to a method for making an anatomical check valve such as a valve for the heart. The valve permits flow in one direction and prevents it in the other. This method enables a thin body to be made with the necessary structural accuracy and integrity required for survival of a patient in which it is implanted.

---

This invention relates to a method for making an anatomical check valve useful as an implant in the human body such as a replacement for a valve in the heart.

Check valves which permit unidirectional flow through conduits in a human body have been known, and in general perform the same functions as check valves in any other hydraulic installation. Namely, they open up to permit flow in one direction and close to prevent it in the other. However, in implants for human beings, the valve must operate at low pressure differentials and be absolutely efficient and reliable, or the patient may die. Reliability could be enhanced by the use of many known valving techniques used in the other check valves, but unfortunately the techniques used in the other valves are not generally useful in blood streams. This class of valves suffers from many restraints which are not imposed on check valves generally. One of these restraints is the tendency of blood to clot where a valve or associated devices creates a discontinuity in the flow, or where the blood is trapped in crevices in the valve, or where the blood is sheared or placed in compression by operation of the valves.

There is a class of valve which can overcome the foregoing limitations. It includes a generally tubular section which is attached to the body at an open end by means such as suturing. Its other end includes a plurality of convex leaflets disposed in the axial path of the stream. These leaflets are quite flexible and are readily spread apart to allow blood to flow between them in the forward direction of flow. They readily close against one another when the differential pressure is removed or reversed. These leaflets must be flexible enough to open readily with a minimum of lost energy, and to close swiftly in order to prevent backflow. The slits between the leaflets must be a very accurately made in order to avoid leakage between them. The valves are generally made of a silicone rubber structure, and making them as heretofore has been time-consuming and expensive. Furthermore, the prior art product has varied from item to item so that it was not always possible to predict the exact properties of an individual device. This invention provides an expeditious, reliable, repeatible, reproducible, production-oriented means for making an optimum valve of this class, which valve is readily made to close tolerances, and which functions in an optimum manner.

The valve produced by the method of this invention includes a base member adapted to be attached to the body, such as to the aortic root, together with side walls which are integral therewith. Between the side walls there is a plurality, preferably three, of leaflets which meet at a central apex and form slits between themselves which can be opened by a positive (forward) differential pressure, and closed of its own accord against reverse flow when exposed to no or to low negative (rearward) differential pressure. The leaflets are concave inwardly from the outside of the valve and present a convex face to the stream flow, which convex face is distorted by positive differential pressure in order to open the valve.

The method of this invention includes the use of a plug having a cylindrical shank, a plurality of recesses contiguous to the shanks, and an equal number of radially-directed intersections of the surfaces forming the recesses. An equal number of parallel posts is formed substantially parallel to and spaced apart from the shank. The posts, shank and recesses are coated with silicone rubber in its liquid condition, and then a layer of flexible meshlike material is applied to this coating over the areas of the shank and of the recesses, and the excess of the mesh-like material (if any) is drawn upon the posts. Next, the mesh-like material is coated with silicone rubber in the liquid condition, and the structure is cured to an integral condition. Next, the structure is stripped from the plug, and then there is attached to the structure a reinforcement which comprises a base ring with a plurality of risers. The risers are inserted in the holes left by removal of the plug posts, and the side walls are sutured to the base ring. Next, the region of the device adjacent to the base ring is coated with silicone rubber in liquid condition, and the device is cured.

According to a preferred but optional feature of the invention, the mesh-like material is extended beyond the intersections of the plug, and the slits are formed by cutting off the excess, the trimmed edge being coated with silicone rubber.

The above and other features of this invention will be fully understood from the following detailed description and the accompanying drawings which:

FIG. 1 is a side elevation of a plug used in the method of this invention;

FIG. 2 is a top view of FIG. 1 taken at line 2—2 thereof;

FIG. 3 is a side elevation as in FIG. 1, showing a step in the method;

FIG. 4 is a plan elevation of mesh material used in the device;

FIGS. 5 and 6 show two additional steps in the method;

FIG. 7 is a bottom view of the structure stripped from the mold of FIG. 6;

FIG. 8 is a side elevation of a reinforcing ring used in the invention;

FIG. 9 is a top view of FIG. 8 taken at line 9—9 thereof;

FIGS. 10 and 11 are sequential steps utilizing the components of FIGS. 7 and 8; and FIGS. 12 and 13 are fragmentary side elevations and end views, respectively, of the valve showing the final optional step in forming the slits.

A plug 20 useful as a forming die in making the valve is shown in FIG. 1. It includes a base 21 with a cylindrical shank 22 rising therefrom to intersections with three recesses 23, 24, 25. These recesses are concave and meet at intersections 26, 27, 28. The intersections are quite sharp, and have minimum width in order that the slits which are formed with them as a reference will be normally closed. Spaced to one side of the cylindrical shank are three posts 29, 30, 31, which posts are spaced from the shank and are parallel to the side walls. The term "side wall" as used herein refers to the region between adjacent intersections, and there are three of them. The posts are spaced in radial alignment with the said intersections.

The first step in the construction of the valve is shown in FIG. 3 wherein the entire plug except the base is coated, by dipping or by painting, with silicone rubber in a liquid condition. It is preferred, but not necessary, that an air-curing grade of this material be used, and normally it will be of a medical grade. This coating is partially cured to form a layer, but before it is completely cured, three pieces of mesh 33 are applied to the respective side walls. It is possible to apply the mesh as a tube over the layer, but it has been found that an improved valve results when the mesh is applied in three pieces. The preferred material at the present time is polypropylene mesh, 30 denier, interlocked. The mesh is pressed against the side wall and down into the recesses, and the excess is gathered onto the post where it may be sutured or otherwise held in place. In many circumstances, the adhesion between the mesh and the first layer 32 of silicone will be enough to hold it in place. There now results a substantially tubular layer of mesh material upon layer 32 of silicone rubber.

Next, the entire surfaces are coated again with silicone rubber of the same general class as that of the first layer so as to form a continuous structure which encapsulates the mesh and the posts. This layer 34 forms the outside structure of the device, and the posts are spaced apart from the side walls a short enough distance that it is readily filled in with this material. Thereafter, the structure is at least partially cured, and is cured to the extent necessary that it will remain integral as it is stripped from the plug. The plug is preferably Teflon-coated for ease in removal of the structure.

As a next step, a reinforcement 40 comprising a base ring 41 with three risers 42, 43, 44 is added to the structure. The base ring has three undulations so that the base structure of the valve may conform to that of the aorta to which it will be sutured. The risers are silver-soldered or otherwise attached to the base ring, which ring and risers may readily be made of stainless steel. The diameter of the risers is about equal to the diameter of holes 45, 46, 47 which are formed in the structure upon removal of the post from the device. The risers are inserted into the respective holes, and the material of the side walls is brought inside the base ring and fastened to the same, so as to form a cuff 48 around base ring 41. Now the cuff is coated with a layer 49 of silicone rubber and the holes are filled up with it. In addition, any discontinuities such as discontinuity 50 are filled in such as by brush painting of silicone rubber to make a smooth and continuous device. It will be noted that the interior of the device has no discontinuities because of the manner in which it is constructed.

Now, had the structure been made with mesh and silicone rubber terminating exactly at the intersections, slits would already be formed. However, this technique requires additional skill on the part of the workman (although it can be done), and it is preferred that a structure such as that shown in FIG. 12 be made wherein the mesh and silicone material projected about 5 mm. above the intersections. Then, after completion, a cut may be made at dashed line 51 (which would be approximately even with the intersections themselves), and a very exact set of slits will be formed which are fully defined internally by the plug and on the edge by the cut. This cut is readily made to very close tolerances by a semi-skilled operator. With this cut, the ends of the leaflets 52, 53, 54 remain raw, so a layer 55 of silicone rubber is applied thereon to finish the device. The device is then again cured, and is in condition for use.

This invention is not to be limited by the embodiment shown in the drawings and described in the description which is given by way of illustration and not of limitation, but only in accordance with the scope of the appended claims.

I claim:
1. The method of making an anatomical check valve which includes a base member, a plurality of side walls, a reinforcement in the base member and along the side walls, an equal number of leaflets continuous with and between the side walls and occluding the passage within the side walls, slits being formed between the leaflets to allow unidirectional flow past the leaflets, said method comprising:
   (a) using a plug having a cylindrical shank, a plurality of recesses contiguous to the shank, and an equal number of radially-directed intersections of the surface forming said recesses, and an equal number of posts substantially parallel to and spaced apart from said shank, coating said shank and posts with silicone rubber in liquid condition;
   (b) applying a layer of flexible mesh-like material to the said coating over areas of the shank and of the recesses and drawing a portion of said layer onto and around each of said posts;
   (c) coating the mesh-like material with silicone rubber in liquid condition;
   (d) curing the aforesaid to a structure having side walls and recesses;
   (e) removing the structure from the plug;
   (f) attaching to the structure a reinforcement which comprises a base ring and a plurality of risers by inserting the risers in the holes left in the structure by removal of the plug posts, and by suturing the side walls of the structure to the base ring; thereby forming at least a portion of the base member;
   (g) coating the region of the device adjacent to the base ring with silicone rubber in liquid condition; and
   (h) curing the device.

2. The method according to claim 1 in which the mesh extends axially beyond the intersections, and, after the device is cured, that portion which extends axially-beyond the intersections is cut off so as to form slits between the leaflets, and then applying silicone rubber to the cut edges.

References Cited

UNITED STATES PATENTS

| 2,580,264 | 12/1951 | Wright et al. | 264—222 X |
| 3,197,788 | 8/1965 | Segger | 3—1 |
| 3,320,972 | 5/1967 | High et al. | 3—1 X |

OTHER REFERENCES

Comparative Study of Some Prosthetic Values for Aortic and Mitral Replacement by Hufnagel and Conrad in Surgery, January 1965, vol. 57, pp. 205–210.

JOHN F. CAMPBELL, *Primary Examiner.*

P. M. COHEN, *Assistant Examiner.*

U.S. Cl. X.R.

3—1; 29—460; 137—525; 264—305

UNITED STATES PATENT OFFICE
CERTIFICATE OF CORRECTION

Patent No. 3,445,916     Dated May 27, 1969

Inventor(s) Rudolf R. Schulte

It is certified that error appears in the above-identified patent and that said Letters Patent are hereby corrected as shown below:

Column 1, line 53, delete "a" at the end of the line. Column 2, line 9, "shanks" should read --shank--; Column 2, line 35, after "drawings" and before "which" insert --in--. Claim 1, column 4, line 20, "surface" should read --surfaces--; Claim 2, column 4, line 44, "axially-beyond" should read --axially beyond--.

SIGNED AND
SEALED
MAR 24 1970

(SEAL)
Attest:

Edward M. Fletcher, Jr.
Attesting Officer

WILLIAM E. SCHUYLER, JR.
Commissioner of Patents